UNITED STATES PATENT OFFICE.

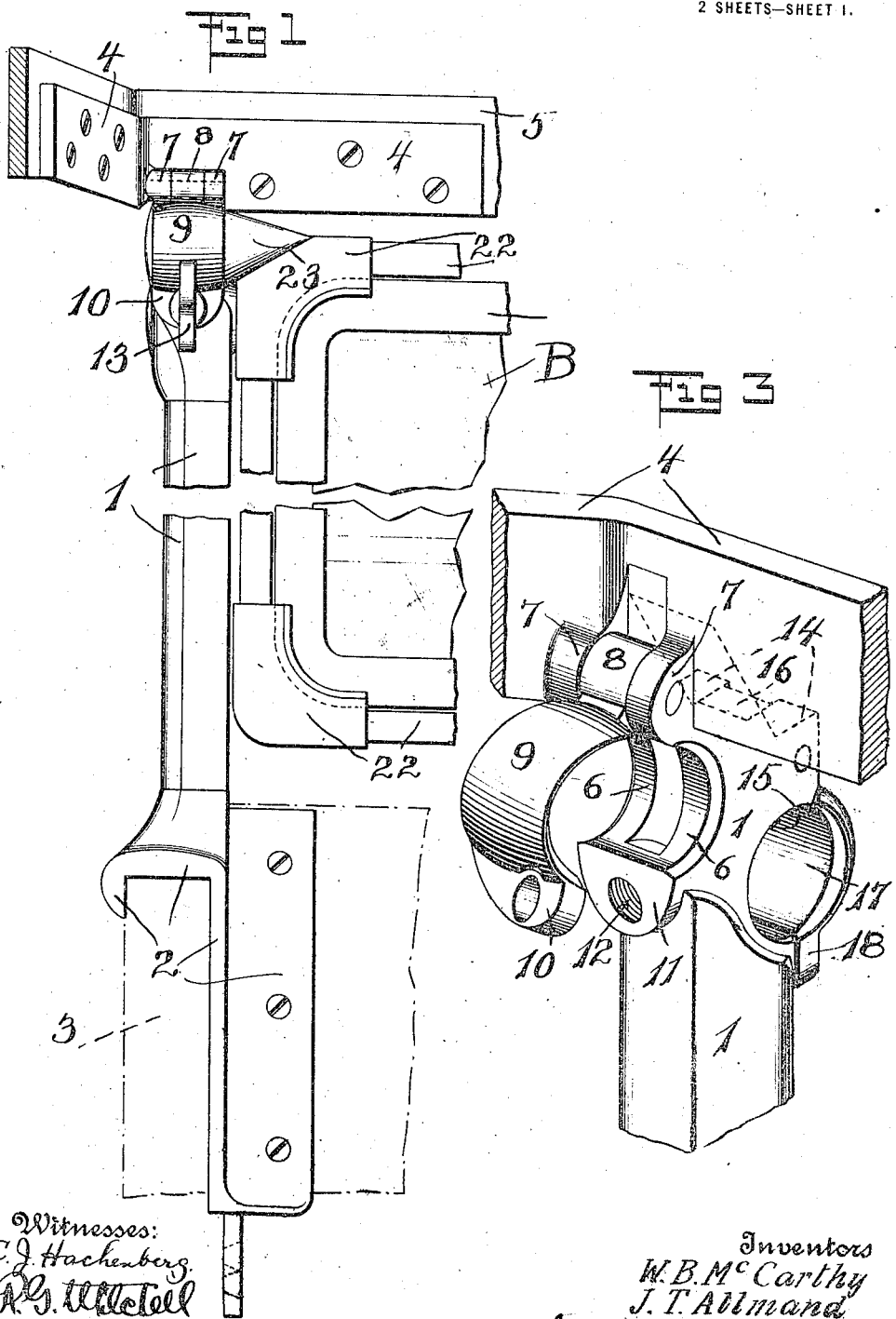

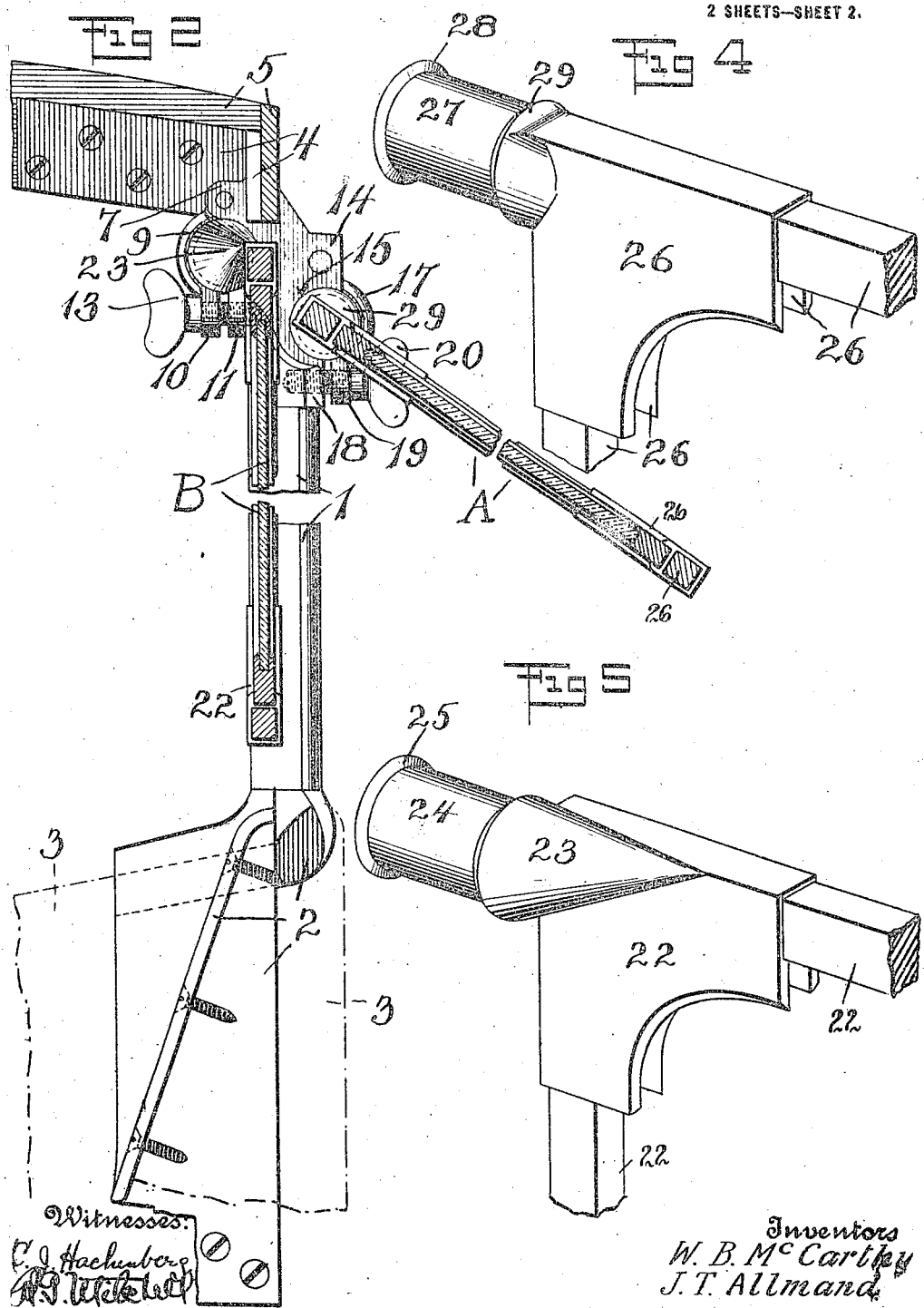

WILLIAM B. McCARTHY, OF MILFORD, CONNECTICUT, AND JOHN T. ALLMAND, OF HIGHLAND PARK, MICHIGAN, ASSIGNORS TO THE ROSTAND MANUFACTURING COMPANY, OF MILFORD, CONNECTICUT, A CORPORATION OF CONNECTICUT.

WIND-SHIELD.

1,162,733.

Specification of Letters Patent.  Patented Nov. 30, 1915.

Application filed February 15, 1915. Serial No. 8,197.

*To all whom it may concern:*

Be it known that we, WILLIAM B. McCARTHY and JOHN T. ALLMAND, citizens of the United States, residing, respectively, at Milford, New Haven county, State of Connecticut, and Highland Park, Wayne county, State of Michigan, have invented certain new and useful Improvements in Wind-Shields, of which the following is a full, clear, and exact description.

This invention relates to wind shield construction and particularly to a construction wherein means are provided for insuring a clear vision for the user, as well as convenience of arrangement of parts and simplicity of manipulation.

One embodiment of the invention is described in detail in the following specification taken in connection with the accompanying drawings forming part thereof and illustrating a preferable embodiment of an invention in a wind shield structure.

In these drawings Figure 1 is a fragmentary view in rear elevation of a wind shield structure embodying the improvements of the present invention. Fig. 2 is a vertical sectional view through the structure shown in Fig. 1. Fig. 3 is a fragmentary perspective view of the upper portion of a standard showing the double socket arrangement. Figs. 4 and 5 are perspective views of the hub corner portions of the outer and inner wind shield sections respectively.

Referring to these drawings by numerals, 1 designates a supporting standard of the wind shield structure of which there are usually two in practice. This standard is supported from the body of the car to which it is applied by a suitable supporting means, the nature of these means depending upon the particular type of car body. In the present instance, we have shown our wind shield structure as applied to a limousine body, the standard 1 at its lower end being provided with an attaching foot formed by flanged plates 2 conforming to the structure of the dash and secured thereto in an appropriate manner as suggested in the drawings. The dash is suggested in dotted lines at 3, Figs. 1 and 2. The upper portion of the standard may be secured to the roof of the limousine body and in such event, the upper end is provided with transversely extending arms 4 arranged at an angle conforming to the angle of the inner side of the roof flange, indicated at 5, Figs. 1 and 2, these arms being secured to the roof in a suitable manner, as by the screws shown.

The standard 1 which is preferably hollow is provided with supporting means for two separate wind shield sections, these supporting means being laterally spaced from each other, so that the wind shield sections supported thereby will be located in different planes. We provide these supports by forming the upper end of the standard 1 at opposite sides of the arms 4 with socket portions by which the wind shield sections are supported. On the inner or car side of the standard, we form a semi-circular socket 6 with spaced ears 7 thereabove and at the inner side of and integral with the arms 4. Between these ears is pivoted the upper end 8 of a complemental and swinging socket section 9, the lower end of this section having a foot piece 10 engaging with the abutment face 11 of the fixed socket section in which face is formed a threaded bore 12. A thumb screw 13 extends through a smooth bore in the foot 10 and into the threaded bore 12 to clamp these parts together about a wind shield hub as will be hereinafter seen. The standard 1 on its outer face and laterally spaced from the socket 6, is provided with a second substantially semi-circular socket portion 15, and with spaced flanges 14, between which the upper end 16 of a complemental and relatively movable socket section 17 is pivoted (see Fig. 3). The lower end of this movable socket section, indicated at 18, has a smooth bore therethrough, and the base of the fixed socket indicated at 19, is provided with a threaded bore, so that a second thumb screw 20 may draw the two parts of the socket together for coöperation with a second wind shield section. These fixed socket sections with the hinging ears and flanges 2, are preferably formed integral with the standard 1, as by casting.

With the construction described, two wind shield sections are used. The inner of these sections, which we have designated at B in the drawings, may be of any usual and standard construction. Preferably, a holding frame 22 is used, this frame being of any suitable construction. One of the corners is provided with an offset portion 23 terminating in a hub 24 of less diameter. This hub is designed to rest within the socket formed by the members 6 and 9, the offset 23 on the one side and a flange 25 on the other side, holding the hub portion within the socket. By means of the thumb screw 13, the movable section of the socket (which is, of course, thrown upwardly when the hub is inserted), may be clamped about the hub to hold the latter and the attached shield section B in proper position relative to the hood and car. The usual position of this section of the wind shield is indicated in Figs. 1 and 2. It will, of course, be understood that the end of the shield frame opposite the hub portion 24, is usually journaled in a similar or equivalent manner.

In the forward or outer socket formed by the parts 15—17, the attached hub of an outer wind shield section is mounted. This outer wind shield section is indicated by A, Fig. 2, and comprises a shield section of standard construction having the usual frame including corner pieces 26, one of the upper corner pieces being formed with the offset portion 27 having end flanges 28 and 29. This hub is seated in the socket formed by the parts 15—17, the movable half socket 17 being first moved upwardly to permit the insertion of the hub, and then moved downwardly over the hub and clamped thereon by means of the thumb screw 20. Both the outer and inner sections A and B are removable from their supports as will be obvious. The inner section B will usually be more or less fixed in position, the outer section A being adjustable relatively thereto. This outer section has a two-fold function. In the first place, it serves as a protection for the inner section, saving it from breakage and thereby, in the event of breakage, leaving still a section of wind shield for use. In the event of breakage of the inner or outer section, the frame may be readily removed, and the glass replaced without there being inconvenience of the lack of a wind shield, this need being filled by the other section. Also the outer section A is intended as a screen for the inner section, so that a clear vision will always be presented through the inner section. This is accomplished by swinging the outer section A outwardly from and at an angle to the inner section B, in the manner suggested in Fig. 2, in which position, the outer section A acts as a screen to prevent the accumulation of rain, snow, or other vision fogging element upon the inner section B of the wind shield. This is possible because the supports for the two sections are laterally spaced from each other, the outer section support being such that the outer shield section is adjustable relatively to the inner section and in one position at least, overlaps or partially overlaps the inner section.

As both shield sections are in reality adjustable, their relative positions may be varied as desired, this permitting adjustment for ventilation or any other purpose. In practice, as we have before suggested, the end of the wind shield frames opposite their hubs 24 and 27, will be provided with means for hingedly supporting the frame at that point in a similar or equivalent manner. The means used may be a reverse duplicate of the structure herein described, or may be an equivalent means, which will furnish the requisite support.

While we have herein illustrated a particular form of hinge joint for the shield sections, it will be understood that our invention is in no wise limited to this specific form, but that any suitable type of hinge joint may be employed, the portion of the joint formed integral with the standard being modified in structure to accord with the particular type of hinge joint employed.

What we claim, therefore, and desire to secure by Letters Patent is:

1. A wind shield structure including laterally spaced inner and outer shield sections, a supporting standard therefor, a hinge clamp on the standard hingedly supporting the inner shield section, and a second hinge clamp on the standard disposed forwardly of the first hinge clamp thereon and hingedly supporting the outer shield section whereby said shield sections are supported laterally spaced one in front of the other, and are pivotally adjustable on the standard independently of each other.

2. A wind shield including a supporting standard, a hinge clamp at the upper end of the standard at the forward side thereof, an outer shield section adjustably held by said clamp, a hinge clamp at the upper end of the standard at the rearward side thereof, and an inner shield section adjustably held by said rearward hinge clamp.

3. A wind shield structure including a supporting standard having adjacent socket portions located in different laterally spaced planes, a shield section for each socket portion, said sections having hubs fitting in said socket portions with means for adjustably holding said hubs therein, with their respective attached shield sections in different planes, said sections in one position, overlapping in part.

WM. B. McCARTHY.

Witnesses:
 FLORA B. DONNELLY,
 MAE F. HICKEY.

JOHN T. ALLMAND.

Witnesses:
 A. MENDELSON,
 P. T. SWISHER.